United States Patent [19]
Sheikholeslami et al.

[11] Patent Number: 4,774,563
[45] Date of Patent: Sep. 27, 1988

[54] COLOR VIDEO SWITCHING CIRCUIT

[75] Inventors: Amir M. Sheikholeslami, Arlington Heights; Glenn T. Turro, Oak Park, both of Ill.

[73] Assignee: Zenith Electronics Corporation, Glenview, Ill.

[21] Appl. No.: 45,912

[22] Filed: May 1, 1987

[51] Int. Cl.⁴ .......................................... H04N 5/262
[52] U.S. Cl. ..................................... 358/22; 358/181
[58] Field of Search ......................... 358/22, 181, 183

[56] References Cited

U.S. PATENT DOCUMENTS 3,702,898 11/1972 Webb ................................... 358/181
4,104,678 8/1978 Van Roessel ...................... 358/181
4,678,929 7/1987 Alpaiwalla .......................... 358/181

FOREIGN PATENT DOCUMENTS 158677 9/1984 Japan .................................... 358/181

Primary Examiner—Tommy P. Chin

[57] ABSTRACT

A color video switching circuit comprises a first and a second emitter-follower transistor receiving color video input signals from different sources and being connected at their emitters to a pair of oppositely poled diodes having a junction connected to a common output terminal. An AND gate and an inverter are coupled to the emitters of the transistors for applying complementary voltages thereto to simultaneously bias one transistor into saturation to preclude passage of its associated color video signal to the output terminal and bias the other transistor into its active region for coupling its associated color video signal to the output terminal. The diode associated with the saturated transistor is also back-biased to enhanced isolation of the non-selected video signal from the output terminal.

6 Claims, 1 Drawing Sheet

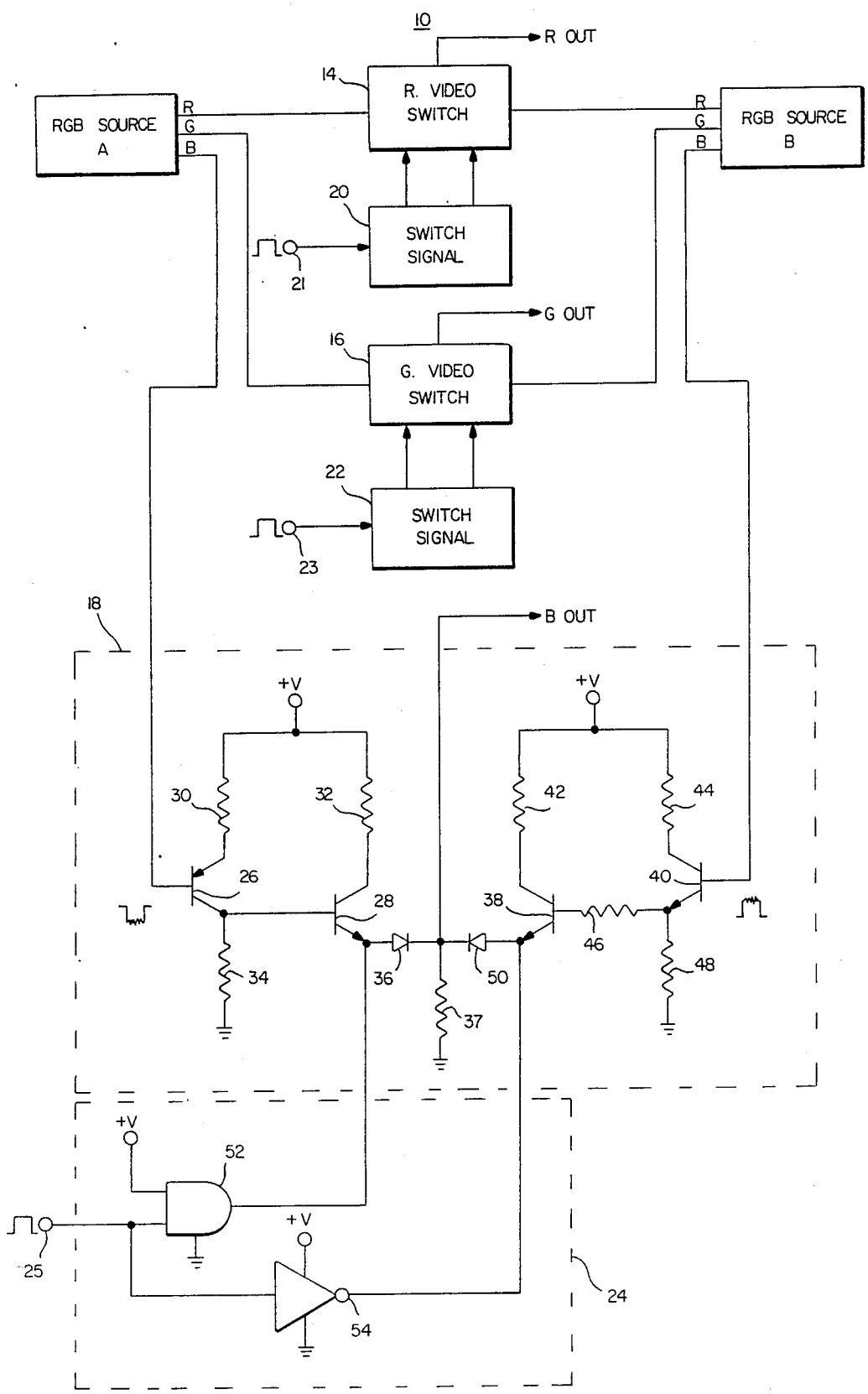

COLOR VIDEO SWITCHING CIRCUIT

BACKGROUND OF THE INVENTION AND PRIOR ART

This invention relates generally to video signal switching circuits and particularly to color video signal switching circuits that are used in color television receivers or video monitors for selecting, at a pixel rate, between two different input sources of video signals.

The practice of mixing video signals for display on a cathode ray tube (CRT) viewing screen has created a need for video switching circuits for selectively coupling the different video inputs to the CRT. It is, of course, essential that switching between the different video signals be accomplished without significant distortion or interference. While the prior art includes switching circuits that operate at a line scanning rate, such video switches are not capable of clean switching at a video or pixel rate. An example of such a switching circuit is shown in U.S. Pat. No. 3,702,898 issued 11/14/72. As those skilled in the art know, a pixel is the smallest video element that can be generated on the CRT screen and is used primarily in conjunction with outputs from computers and digital sources. What the prior art lacks is a simple high speed video switching circuit which will permit selective or mixed viewing of two different signal sources at a video or pixel rate without distortion or interference.

The present invention uses open collector connected switching devices for driving the different video signal transistors into and out of saturation. The invention eliminates the normal switching delay caused by minority carriers being cleared out of the base region when the transistor is operated from cutoff to its linear region. Since the transistors are never in cutoff, the transition between video signals is very rapid and without a delay between the signals.

OBJECTS OF THE INVENTION

A principal object of the invention is to provide a novel video switching circuit.

Another object of the invention is to provide a low cost video switching circuit for selecting between two video input signals in response to a switching signal.

BRIEF DESCRIPTION OF THE DRAWING

These and other objects and advantages of the invention will be apparent upon reading the following description in conjunction with the drawing, the single figure of which is a simplified block and schematic diagram of a video switching circuit constructed in accordance with the invention.

DESCRIPTION OF THE PREFERRED EMBODIMENT

Referring to the drawing, a color video switching circuit, generally designated 10, includes a red video switch 14, a green video switch 16 and a blue video switch 18 (indicated in dashed lines). A pair of sources of R, G and B signals, identified as A and B, each supply respective R, G and B video output signals. The R signals from sources A and B are supplied to respective inputs of video switch 14, the G signals to respective inputs of video switch 16 and the B signals to respective inputs of video switch 18. Each video switch is supplied with complementary switching signals, with switch 14 being supplied with complementary switching signals from a block 20, labelled SWITCH SIGNAL, that has an input 21 for reception of a suitable switch voltage, illustrated as a square wave. Similarly, green video switch 16 is supplied with complementary switching signals developed by switch signal block 22 in response to an appropriate square wave pulse at its input 23 and, as will be discussed in detail, blue video switch 18 is driven from a switch signal source 24 (in dashed lines) in response to a square wave input signal at terminal 25. Each of the R, G and B video switches supplies an output signal consisting of the video signal from either source A or source B, depending upon the switch signals. The outputs are labelled R out, G out and B out, respectively.

It will be appreciated that the block diagram portions of the circuit for "R" and "G", respectively, include the same elements as the schematic portions illustrated for "B". Thus the explanation for blue video switch 18 and switch signal source 24 will apply to the R and G video switches 14 and 16 and switch signal sources 20 and 22, respectively.

Blue video switch 18 includes a PNP video amplifier transistor 26 having its base supplied with the blue video signal from RGB source A, its emitter connected to a source of positive DC voltage $+V$ through a resistor 30 and its collector connected to ground through a resistor 34. Its collector is coupled to the base of an emitter follower NPN transistor 28, having a collector connected to $+V$ through a resistor 32 and an emitter connected to ground through a diode 36 and a resistor 37. The junction of diode 36 and resistor 37 comprises the B video output terminal. The emitter of transistor 28 is also connected to switch signal source 24 as will be further described. A similar arrangement includes an NPN video transistor 40 having its base supplied with the blue video signal from RGB source B, its collector connected to $+V$ through a resistor 44 and its emitter connected to ground through a resistor 48. Its emitter is also connected through a resistor 46 to the base of a NPN emitter follower transistor 38 having its collector connected to $+V$ through a resistor 42 and its emitter coupled to the B video output terminal through a diode 50. Its emitter is also connected to switch signal source 24.

Switch signal source 24 comprises a two input AND gate 52 having one input connected to $+V$ and its other input connected to a terminal 25. The output of AND 52 is connected to the junction of the emitter of emitter follower transistor 28 and the anode of diode 36. Terminal 25 is also connected, through an inverter 54, to the junction of the emitter of emitter follower transistor 38 and the anode of diode 50. Both AND 52 and inverter 54 have suitable ground connections as shown.

The distinguishing characteristic of AND 52 and inverter 54 are that they are open collector connected devices and present a very high impedance when their outputs are logically high and a very low impedance when their outputs are logically low. Thus when the gates have logically high outputs, the emitters of transistors 28 and 38 see very high impedances, and when the gates have logically low outputs, the emitter of the transistors see very low impedances, i.e., ground potential.

A key aspect of the present video signal switching arrangement is that emitter follower transistors 28 and 38 are always in a state of conduction. That is, these transistors are either operating over their normal conductive range to pass video signals or are operating in saturation with their emitters connected to ground. When the transistors operate in saturation, the video signals at their inputs are not coupled through the respective one of diodes 36 and 50 to the B output terminal which provides a first degree of isolation between the non-selected video signal and the output terminal. Further, the diode associated with the saturated one of the emitter follower transistors is back-biased with respect to the B output terminal to provide additional isolation between the signals from RGB source A and RGB source B. Since the emitter follower transistors are never out of conduction, storage problems in the junctions of the transistors are eliminated and high speed coupling of video signals to output terminal B is accomplished.

In operation, signals from RGB sources A and B are continually present and applied to the bases of video amplifier transistors 26 and 40, respectively, and thereby to the bases of emitter-follower transistors 28 and 38, respectively. It will be understood by those skilled in the art that the switching signals applied to terminals 21, 23 and 25 of the switch signal sources 20, 22 and 24 are effective for producing either a ground potential or a very high impedance at the outputs of AND 52 and inverter 54, respectively, depending upon which of the video signals from RGB sources A and B is to be coupled to the output terminals. The switching signals applied to the terminals 21, 23 and 25 may, of course, all comprise the same signal. The RGB video signals from source A will be coupled to the output terminals when the switching signal is logically high. In this case, the output of AND 52 will be logically high and present a very high impedance to the emitter of transistor 28. This high impedance, which essentially comprises an open circuit, biases transistor 28 in its active region for coupling the B signal from RGB source A to the output terminal. The DC level of the B signal forward biases diode 36 to develop the B video signal from RGB source A across load resistor 37. Simultaneously, the output of inverter 54 will be logically low thereby pulling the emitter of emitter-follower transistor 38 to substantially ground potential, resulting in transistor 38 being driven into saturation. Consequently, the B video signal from RGB source B is isolated from and not coupled to the B output terminal. Further isolation between the B video signal from source A and the B video signal from source B is achieved because diode 36 is in conduction and the voltage across resistor 37 back-biases diode 50, the anode of which is at ground potential. Therefore not only is high speed switching achieved by the inventive circuit arrangement where the transistors are never out of conduction, but increased isolation between the selected and non-selected video signals is provided.

When the switch signal is logically low, the opposite video signal is passed to the output terminal. In this event, the output of AND 52 will be logically low and present a low impedance to the emitter of transistor 28, resulting in it being driven into saturation and isolating the B signal from RGB source A from the B output terminal. The output of inverter 54, on the other hand, will be logically high and present a high impedance to the emitter of transistor 38, thus biasing it in its active region and coupling the B signal from RGB source B to output terminal B. The resulting voltage across resistor 37 now backbiases diode 36 to yield further isolation between the video signals from the two sources A and B.

What has been described is a novel video switching circuit that can switch video signals at a pixel rate with minimum distortion or interference. It is recognized that numerous changes in the described embodiment of the invention will be apparent to those skilled in the art without departing from its true spirit and scope. The invention is to be limited only as defined in the claims.

What is claimed is:

1. A video switch for selectively coupling a first and a second video signal to an output terminal comprising:
   first transistor means;
   second transistor means;
   means coupling said first video signal to said first transistor means;
   means coupling said second video signal to said second transistor means; and
   switch means for biasing one of said first and said second transistor means into its active conductive region for coupling a respective one of said first and said second video signals to said output terminal and for biasing the other of said first and said second transistor means into saturation for isolating the other of said first and said second video signals from said output terminal.

2. The video switch of claim 1 wherein said first and said second transistor means each include an emitter-follower transistor and wherein said switch means includes an isolation diode coupled from the emitter electrode of each of said emitter-follower transistors, respectively, to said output terminal.

3. The video switch of claim 2 wherein said switch means further includes open collector type switching gate means generating complementary output signals for biasing said first and second transistor means.

4. A color video switch comprising:
   a first input coupled to a first source of R, G or B video signal;
   a second input coupled to a second source R, G or B video signal;
   first and second emitter-follower transistors coupled respectively to said first and said second inputs;
   an output terminal;
   a diode connected between said output terminal and each of said first and said second emitter-follower transistors, respectively;
   open collector type switching gate means for selectively biasing one of said emitter-follower transistors into saturation to preclude passage of its respective color video signal to said output terminal while back-biasing its respective diode to increase the isolation between its respective color video signal and said output terminal and for biasing the other of said transistors into its active conductive region for coupling its respective video signal to said output terminal.

5. The color video switch of claim 4 wherein said open collector type switching gate means comprise an AND gate and an inverter for providing, respectively, open circuit and ground potentials to the emitters of said transistors for biasing.

6. The color video switch of claim 5 wherein said AND gate and said inverter develop complementary output potentials in response to an applied switching signal.

* * * * *